United States Patent Office 3,637,753
Patented Jan. 25, 1972

3,637,753
MONOCARBAMATES AND N-LOWER ALKYL OR N-PHENYL MONOCARBAMATES OF SUBSTITUTED AND UNSUBSTITUTED 1-PHENYL-2,2-DIALKYL-1,3-DIHYDROXYPROPANES
Kurt Kulka, New York, N.Y., assignor to Fritzsche Dodge & Olcott Inc., New York, N.Y.
No Drawing. Division of application Ser. No. 423,327, Jan. 4, 1965, now Patent No. 3,415,844, which is a continuation-in-part of applications Ser. No. 282,549, May 23, 1963, and Ser. No. 284,331, May 31, 1963. This application Sept. 23, 1968, Ser. No. 761,797
Int. Cl. C07d 13/10
U.S. Cl. 260—340.5                         25 Claims

ABSTRACT OF THE DISCLOSURE

The monocarbamates of this invention manifest tranquilizing effects in animals. When administered to animals they produce narcosis that emphasizes relaxation. The monocarbamate and N-lower alkyl monocarbamates are produced by the utilization of 1-phenyl-2,2-dialkyl-1,3-dihydroxypropanes, 1-substituted phenyl-2,2-dialkyl-1,3-dihydroxypropanes or certain derivatives of such dihydroxypropanes. The monocarbamates may be primary or secondary monocarbamates or mixtures of them, depending upon the method employed to produce them.

This application is a divisional application of the co-pending application of Kurt Kulka S.N. 423,327, filed Jan. 4, 1965, now Pat. No. 3,415,844, which is a continuation-in-part application of the application, S.N. 282,549, filed May 23, 1963, now abandoned, and the application, S.N. 284,331, filed May 31, 1963, now abandoned.

The monocarbamates and N-substituted monocarbamates of 1-phenyl-2,2-dialkyl-1,3-dihydroxypropanes and 1-substituted phenyl-2,2-dialkyl-1,3-dihydroxypropanes of this invention manifest tranquilizing effects in animals. When administered to animals, they produce narcosis that emphasizes relaxation.

The monocarbamates and N-substituted monocarbamates in which the substituent is lower alkyl are usually produced by the utilization of monoalkylcarbonates having not more than 5 carbon atoms, cyclic carbonates and monoesters of carboxylic acids having not more than 5 carbon atoms of a 1-phenyl-2,2-dialkyl-1,3-dihydroxypropane and a 1-substituted phenyl-2,2-dialkyl-1,3-dihydroxypropane having the following formula:

(1) 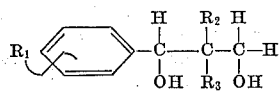

in which $R_1$ is hydrogen, alkyl having less than 6 carbon atoms, hydroxy, alkoxy having less than 6 carbon atoms, dialkoxy of alkoxy radicals having less than 6 carbon atoms, methylenedioxy, halogen, dihalogen, trihalogen and a fused benzene ring and $R_2$ and $R_3$ are alkyl groups in which the total number of carbon atoms is at least 2 and less than 8.

The monoalkylcarbonates and cyclic carbonates are produced by reacting a lower alkyl chloroformate dissolved in a suitable solvent such as benzene with a 1-phenyl-2,2-dialkyl-1,3-dihydroxypropane or a 1-substituted phenyl-2,2-dialkyl-1,3-dihydroxypropane of Formula 1 above.

Desirably, the solution of the glycol contains a tertiary amine such as a trialkyl amine or pyridine. Preferably, the alkyl group in the alkyl chloroformate does not contain more than 5 carbon atoms. Methyl or ethyl chloroformate is conveniently employed. The gradual addition of the alkyl chloroformate to the glycol is conducted with agitation and agitation is continued for several hours at about room temperature. The reaction mixture is then warmed to 45–60° C. for several hours. Water is added with agitation and the reaction mixture separates into two layers, an aqueous layer and an organic solvent layer containing the desired carbonates. The organic solvent layer is washed successively with water, with an aqueous mineral acid, with a saturated alkali metal bicarbonate solution and finally with water until neutral to litmus. The solvent such as benzene is distilled off. The monoalkyl carbonates and the cyclic carbonate of 1-phenyl-2,2-dialkyl-1,3-dihydroxypropane or a 1-substituted phenyl-2,2-dialkyl-1,3-dihydroxypropane of this invention may be employed to produce the monocarbamates of these glycols.

To produce the monocarbamates of the glycols, the mixtures of monoalkyl carbonates and the cyclic carbonate of 1-phenyl-2,2-dialkyl-1,3-dihydroxypropane or a 1-substituted phenyl-2,2-dialkyl-1,3-dihydroxypropane is added to ammonia water and a mutual solvent for the carbonates such as isopropyl alcohol or 2-ethoxyethanol (Cellosolve). The mixture is agitated at room temperature and a stream of ammonia gas is introduced into the mixture over a period of 10 to 20 hours. The passage of ammonia gas through the solution is then terminated, the excess ammonia removed by heating the reaction mixture and the solvent removed by vacuum distillation. The residual viscous liquid is dissolved in a suitable solvent such as toluene or benzene, water is added and the monocarbamates are precipitated. Desirably, the monocarbamates if solids are separated on a Buchner funnel and are purified by further recrystallization from a suitable solvent such as toluene or isopropyl alcohol. In the procedure heretofore described, a mixture of two monocarbamates of the glycol employed is produced. One of these monocarbamates the 1-phenyl or 1-substituted phenyl-2,2-dialkyl-1,3-dihydroxypropane-3-carbamate is produced by the reaction of the primary hydroxyl of the glycol, while the other monocarbamate, the 1-phenyl or 1-substituted phenyl-2,2-dialkyl-1,3-dihydroxypropane-1-carbamate is produced by the reaction of the secondary hydroxyl of the glycol. The two monocarbamates may be separated from each other by repeated recrystallization or other convenient procedure.

If desired, a hydrogen of the amino group of the monocarbamates may contain an alkyl or aromatic group. To produce such monocarbamates, an alkyl isocyanate, such as methyl isocyanate, or an aromatic isocyanate such as phenyl isocyanate, is employed to react with the 1-phenyl-2,2-dialkyl-1,3-dihydroxypropane or the 1-substituted phenyl-2,2-dialkyl-1,3-dihydroxypropane. A slight excess of the alkyl or aromatic isocyanate, such as 1.05 moles of isocyanate to 1 mole of the glycol, is desirably used. The mixture of isocyanate and the glycol is refluxed in a suitable inert solvent such as benzene for a period of approximately four hours or permitted to react at room temperature for a prolonged period, such as 24 hours.

If it is desired to obtain a monocarbamate of this invention produced by the reaction of the primary hydroxyl of the glycol, preferably and alternatively, the required glycol is reacted with phosgene in the presence of an N,N-tertiary aniline, such as dimethylaniline and a mutual solvent such as toluene, tetrahydrofuran or diethylene glycol dimethylether. Conveniently, a molecular equivalent of the required glycol and a molecular equivalent of dimethylaniline are dissolved in a solvent such as tetrahydrofuran or diethyleneglycol dimethylether. This resulting solution is added to a solution of slightly over the molecular equivalent of phosgene dissolved in toluene or other suitable solvents. This addition is conducted with efficient agitation at a temperature of $-10°$ to $+5°$ C. and over a period of approximately 2 to 6 hours. The monochloroformate of the primary hydroxyl group of a glycol is produced without isolation and this monochloroformate, which is the 1-phenyl or 1-substituted phenyl-2,2-dialkyl-1,3-dihydroxypropane - 3 - monochloroformate, is treated immediately with ammonia water to form the desired 1-phenyl or 1-substituted phenyl-1-hydroxy-2,2-dialkyl-3-carbamate.

The monoesters of a carboxylic acid having not more than 5 carbon atoms of 1-phenyl-2,2-dialkyl - 1,3 - dihydroxypropanes and 1-substituted phenyl-2,2-dialkyl-1,3-dihydroxypropanes and resulting from the esterification of the primary hydroxyl of the glycol are produced by reacting the required glycol with a slight excess of the molecular equivalent of the acid in a solvent such as benzene of toluene. The acid employed may be any carboxylic acid having not more than 5 carbon atoms, such as acetic acid, propionic acid or pentanoic acid. A catalyst, such as p-toluene sulfonic acid, methane sulfonic acid or phosphoric acid, is desirably added. On heating the reaction mixture with a water entrainer system, an azeotropic mixture consisting of the water of reaction, the solvent and part of the organic acid accumulates in the water trap. The progress of reaction is followed by measuring the water part and the amount of the organic acid in it. Accordingly, it is sometimes necessary to add fresh organic acid to the reaction in order to replace the acid collected in the water trap. After completion of the reaction, the reaction product is taken up in a solvent, such as benzene or toluene, and washed free of acids. After removal of the solvent, the resulting ester obtained is the ester of the primary hydroxyl group of the glycols employed. This ester is the 1-phenyl or 1-substituted phenyl-2,2-dialkyl-1,3-dihydroxy-propane-alkanoate.

If it is desired to obtain a monocarbamate of this invention produced by the reaction of the secondary hydroxyl of the glycol, the monoester of the primary hydroxyl group is first prepared by reacting the required glycol with a slight excess of the molecular equivalent of carboxylic acid in a solvent such as benzene or toluene as herein described for the production of such monoesters. Desirably, the carboxylic acid has not more than 5 carbon atoms. Such ester of the primary hydroxyl group of the glycol employed is reacted with phosgene, a lower alkyl chloroformate or an aryl chloroformate. Desirably, the aryl of the aryl chloroformate has less than 9 carbon atoms. For example, methyl chloroformate or phenyl chloroformate may be reacted with such monoester. If phosgene is employed, a monochloroformate of the glycol is produced. If a lower alkyl chloroformate or an aryl chloroformate is used, a secondary monocarbonate is produced. The resulting monochloroformate of the glycol or the secondary monocarbonate of the glycol is reacted with ammonia to saponify the ester and produce the monocarbonate. Whether phosgene is employed as a reactant, a lower alkyl chloroformate or aryl chloroformate is used, the resulting product is the secondary monocarbamate of the glycol. The reactions which take place are as follows:

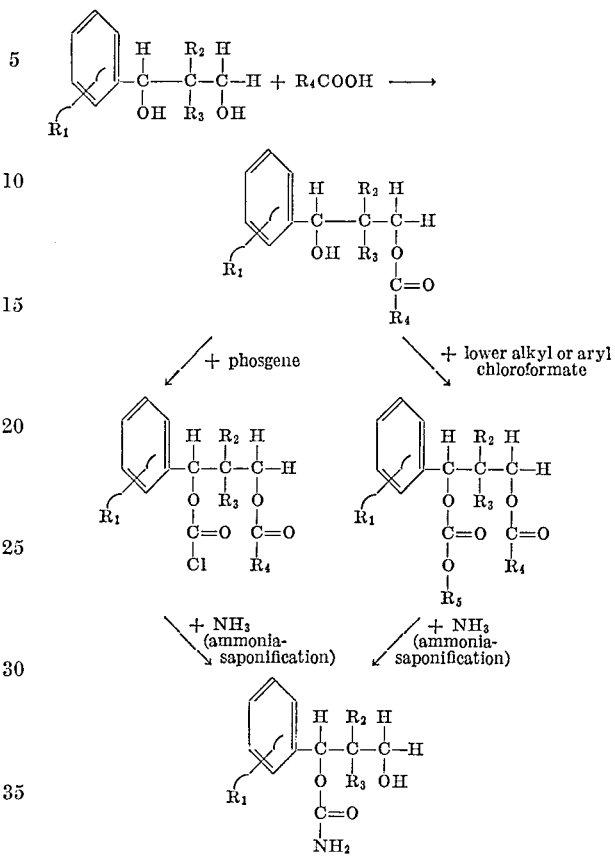

In the above structural formulas, $R_1$, $R_2$ and $R_3$ have the same meaning as heretofore defined; $R_4$ is a lower alkyl and $R_5$ is lower alkyl or aryl.

The 1-phenyl-2,2-dialkyl-1,3-dihydroxypropanes and 1-substituted phenyl-2,2-dialkyl-1,3-dihydroxypropanes used in the production of the compositions of this invention are prepared by reacting in the presence of 1 mole of an alkali metal hydroxide, such as sodium potassium hydroxide, 1 mole of an aromatic aldehyde having the formula:

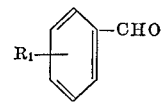

with two moles of an aliphatic aldehyde having the following formula:

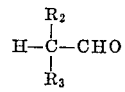

$R_1$, $R_2$ and $R_3$ of the aldehydes have the same meaning as heretofore defined.

The monocarbamates and N-substituted monocarbamates of the 1-phenyl-2,2-dialkyl-1,3-dihydroxypropane or of a 1-substituted phenyl-2,2-dialkyl-1,3-dihydroxypropane of this invention may be utilized as tranquilizers. For this purpose, the monocarbamates or N-substituted monocarbamates may be mixed with a pharmaceutical carrier. For example, 40 g. of the monocarbamates or N-substituted monocarbamates may be dissolved in 1 kg. of a glyceridic oil such as peanut oil and administered to an animal such as a domestic animal in a dosage of 0.4 g. per kilogram of body weight. Again, tablets of the monocarbamates or N-substituted monocarbamates may be prepared by granulating the desired amount of monocarbamates or N-substituted monocarbamates with starch and lactose and compressing them into tablets. Carriers, binders, lubricants and other components may be utilized in conventional manners with the monocarbamates or N-substituted monocarbamates of this invention to produce dosage forms suitable for oral, parenteral or other form of administration.

EXAMPLE I

Preparation of the monomethyl carbonates and cyclic carbonate of 1-(4-methoxyphenyl)-2,2-dimethyl-1,3-dihydroxypropane To a well agitated mixture of 50 g. of 1-(4-methoxyphenyl)-2,2-dimethyl-1,3-dihydroxypropane, 70 ml. of benzene and 26 g. of pyridine was added over a period of 45 minutes a solution of 37 g. of methylchloroformate dissolved in 30 ml. of benzene. During the addition, the reaction mixture was cooled and the temperature was maintained between 18° and 25° C. The reaction mixture was agitated at room temperature for one hour. It was then heated to 52°–62° C. and agitated during the heating and for a period of about five hours thereafter. The reaction mixture stood overnight at room temperature and was then washed successively twice with 100 ml. of a 3% aqueous hydrochloric acid solution, once with 100 ml. of an aqueous saturated sodium bicarbonate solution, and three times with 100 ml. of warm water. The solvent was then distilled off on a steam bath at a slight vacuum. A theoretical yield of the crude reaction products was obtained. I.R. curves indicated that the desired reaction products were produced.

The cyclic carbonate of the 1-(4-methoxyphenyl)-2,2-dimethyl-1,3-dihydroxypropane may be separated out from the crude mixture of carbonates by dissolving this mixture in a suitable solvent such as isopropanol or toluene and keeping this solution under refrigeration at −5° to −10° C. for approximately 24 hours. The cyclic carbonate may be crystallized out and may be separated by filtration on a Buchner funnel. It was found to be present in the above crude mixture in an amount of 15–20% and had a melting point of 138–139° C.

The 1-(4-methoxyphenyl)-2,2-dimethyl-1,3-dihydroxypropane employed as a starting material in this example was prepared by initially adding to 140 g. of 65% potassium hydroxide in 500 ml. of methanol over a period of one and one-half hours a solution of 272 g. of anisic aldehyde and 360 g. of isobutyraldehyde. The mixture was agitated and cooled during the addition, maintaining the temperature at 44°–49° C. After the addition, agitation was continued for 3 hours at a temperature of 42° C. The reaction mixture was cooled to 30° C. and acidified with glacial acetic acid. 250 ml. of methanol were distilled off under agitation from a steam bath. To the residue was added with agitation 100 ml. of water. The mixture separated into two layers. The organic layer was removed and washed with 500 ml. of water. The water layer and washings were combined and extracted with 50 ml. of benzene. The benzene extract was added to the organic layer.

The benzene was removed by distillation. The reaction mixture was then fractionated without a column, as follows:

| Temperature vapor, ° C. | Temperature flask, ° C. | Vac., mm. | Cc. | Wt. |
|---|---|---|---|---|
| 27–160 | 74–186 | 6 | 205 | 194.5 |
| 178–193 | 187–193 | 6 | 250 | 269.<br>1 56 |
| Total | | | | 519.5 |

1 Residue.

The first fraction with a vapor temperature of 27–160° C. consisted mainly of unreacted isobutyraldehyde, anisic aldehyde and the desired glycol. The main section with a vapor temperature of 178–193° C. contained the desired glycol and crystallized on standing. The yield was 65.5% of the theoretical. It was recrystallized from a mixture of 200 ml. of benzene and 150 ml. of hexane. The crystals had a melting point of 71.5–72° C. The wet analysis (acetylation) was 98.9%.

Other 1-(alkoxyphenyl)-2,2-dimethyl-1,3-dihydroxypropanes are produced in the same manner by substituting the required alkoxybenzaldehyde for the anisic aldehyde employed in this example.

EXAMPLE II

Preparation of the monocarbamates of 1-(4-methoxyphenyl)-2,2-dimethyl-1,3-dihydroxypropane A stream of ammonia gas was passed for a period of 17 hours below the surface of a solution containing 30 ml. of 28% ammonia water, 80 ml. of isopropanol and 55 g. of the crude carbonates of 1-(4-methoxyphenyl)-2,2-dimethyl-1,3-dihydroxypropane, prepared as described in Example I. During the introduction of the ammonia gas, the solution was agitated and maintained at room temperature. After the 17 hour period, the solvent was distilled off under vacuum from a steam bath to yield about 50 g. of the crude monocarbamates. The products were recrystallized from a solution of benzene, hexane and isopropanol and again from isopropanol and activated carbon. The melting point was 82° C. The nitrogen determination by Kjeldahl was 5.75% compared with the theoretical of 5.53%. A molecular weight determination by the Rast method was 262 as contrasted with a theoretical value of 253. An I.R. curve indicated the desired compound was obtained.

The derivatives of the corresponding dialkoxy ring substituted glycols, as well as the derivatives of the hydroxy ring substituted glycols, are produced in the same manner as the derivatives of the monoalkoxy ring substituted glycols of Examples I and II. The procedures of Examples I and II are followed except that in the production of the monomethyl carbonates and cyclic carbonates, the molecular equivalent of the dialkoxy ring substituted glycol or the molecular equivalent of the hydroxy ring substituted glycol is employed instead of the 1-(4-methoxyphenyl)-2,2-dimethyl-1,3-dihydroxypropane; and in the production of the monocarbamates, the molecular equivalent of the crude carbonates of the dialkoxy ring substituted or hydroxy ring substituted glycol is employed instead of the crude carbonates of 1-(4-methoxyphenyl)-2,2-dimethyl-1,3-dihydroxypropane.

EXAMPLE III

Preparation of the cyclic carbonate of 1-phenyl-2,2-dimeth-1,3-dihydroxypropane

A solution of phosgene was prepared by dissolving 218 g. of phosgene in 2000 ml. of toluene by adding to the toluene phosgene as a gas with slow agitation over a period of two hours and at a temperature of −2 to −5° C. To this phosgene solution was added, over a period of 12½ hours at a temperature of −1 to −4° C., a solution of 180 g. of 1-phenyl-2,2-dimethyl-1,3-dihydroxypropane and 160 g. of pyridine in 500 ml. of chloroform. The reaction mixture was then permitted to come to room temperature and was then agitated for a period of twelve hours, using an aqueous solution of sodium hydroxide to trap the phosgene vapors escaping from the reaction mixture. Chloroform was distilled off at atmospheric pressure from a steam bath. The residual reaction product was washed three times with 100 ml. of water and dried in a slight vacuum from a steam bath. On standing, it crystallized and was recrystallized from isopropanol. It had a melting point of 112–114° C. A yield of 175 g. representing 90% of the theoretical was obtained. Molecular weight determinations of the crystalline material (Rast method) gave the correct molecular weight of the cyclic carbonate. Examination of the I.R. curve confirmed that the cyclic carbonate was obtained.

The 1-phenyl-2,2-dimethyl-1,3-dihydroxypropane used as a starting material in this example may be produced in accordance with the method described in U.S. Pat. No. 3,040,089 granted on June 19, 1962 to the assignee of Kurt Kulka.

EXAMPLE IV

Preparation of the monocarbamates of 1-phenyl-2,2-dimethyl-1,3-dihydroxypropane

The monocarbamates of 1-phenyl-2,2-dimethyl-1,3-dihydroxypropane are prepared by reacting ammonia gas with the cyclic carbonate of Example III, in accordance with the following reaction:

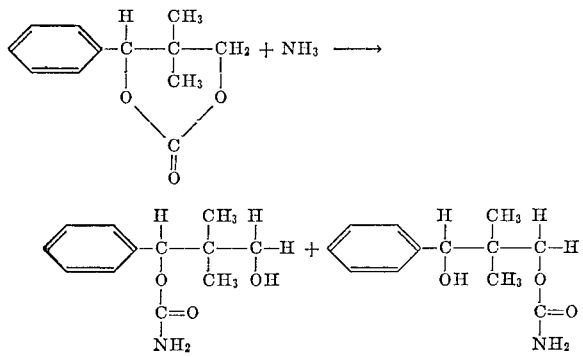

A stream of ammonia gas was passed through a gas inlet tube over a period of 17 hours at room temperature to a solution containing 208 g. of the cyclic carbonate of 1-phenyl-2,2-dimethyl-1,3-dihydroxypropane of Example III in 600 ml. of 28% aqueous ammonium hydroxide and 600 g. of 2-ethoxyethanol. The reaction mixture was then heated on a steam bath to permit the escape of excess ammonia gas. The 2-ethoxyethanol and water were distilled off in a slight vacuum from a steam bath. 2500 ml. of water were added under agitation to the resulting reaction product. The mixture was cooled and agitated. The precipitated crystals were collected on a Buchner funnel and washed with cold hexane. The crystals were then recrystallized from isopropanol with activated carbon and again from xylene. The yield was 54.3% of the theoretical. The melting point was 91–104° C. The nitrogen by Kjeldahl was 6.08% as contrasted with a theoretical value of 6.28%. Molecular weight determination (Rast method) was 231 contrasted with a theoretical value of 223. The I.R. curve indicated the desired product.

EXAMPLE V

Preparation of the monoethyl carbonates and cyclic carbonate of 1-(4-isopropylphenyl) - 2,2 - dimethyl-1,3-dihydroxypropane A solution was prepared by combining in a 3-necked reaction flask 56 g. of 1-(4-isopropylphenyl)-2,2-dimethyl-1,3-dihydroxypropane, 32 g. of triethylamine and 100 ml. of benzene. To this solution was added over a period of three hours, under agitation and while maintaining the reaction mixture between 15–20° C., a solution of 27 g. of ethylchloroformate in 38 ml. of benzene. Agitation was continued for two hours at room temperature. The reaction mixture stood overnight at room temperature. The following day the mixture was heated to 50° C. and was agitated at this temperature for one and one-half hours. It was then cooled and 100 ml. of water were added to the cooled reaction mixture. The two layers which formed were separated. The organic layer was washed successively with 100 ml. of water, three times with 100 ml. of an aqueous 5% solution of hydrochloric acid, once with 100 ml. of water, once with 100 ml. of dilute aqueous sodium bicarbonate solution, and three times with 100 ml. of water. The solution was neutral to litmus. The solvent was removed by distillation under vacuum from a steam bath. 72 g. of the crude reaction products were obtained. An I.R. curve indicated that the desired products were obtained.

The cyclic carbonate of the 1-(4-isopropylphenyl)-2,2-dimethyl-1,3-dihydroxypropane may be separated out from the crude mixture of carbonates in the same manner as the cyclic carbonate of 1-(4-methoxyphenyl)-2,2-dimethyl-1,3-dihydroxypropane was separated from the crude mixture of its carbonates as described in Example I. 21% of the cyclic carbonate having a M.P. of 104–105° C. were obtained.

The 1-(4-isopropylphenyl) - 2,2 - dimethyl - 1,3 - dihydroxypropane employed as a starting material in this example was prepared by initially adding to 212 g. of 85% potassium hydroxide in 700 ml. of methanol over a period of three hours a solution of 444 g. of cuminal (p-isopropylbenzaldehyde) and 468.7 g. of isobutyraldehyde. During the addition, the reaction mixture became cloudy, viscous and changed to a yellow color. After completion of the addition, agitation was continued for 4½ hours at a temperature of 12–16° C. and overnight at room temperature. The following day the reaction mixture was made slightly acidic by the addition of glacial acetic acid. A clear solution resulted. 650 ml. of methanol were distilled off under agitation (from a steam bath). 200 ml. of benzene were added to the residue and the resulting solution was washed twice with 500 ml. of warm water. The benzene was removed from the reaction mass by distillation and the product was fractionated through an 8″ Vigreux column as follows:

| Temperature vapor, ° C. | Temperature flask, ° C. | Vac., mm. | Cc. | Wt., g. |
|---|---|---|---|---|
| 67–146 | 114–165 | 2 | 98 | 95 [1] |
| 147–161 | 165–202 | 3 | 527 | 527 [2] |
|  |  |  |  | 50 [3] |
| Total |  |  |  | 672 |

[1] Front section.
[2] Main section.
[3] Residue.

The main section crystallized on standing. It was recrystallized from hexane and had a melting point of 58–60° C. The wet analysis (acetylation) was 99.1%. The yield was 79% of the theoretical.

Other 1-(alkylphenyl) - 2,2-dimethyl-1,3-dihydroxypropanes are produced in the same manner by substituting the required alkylbenzaldehyde for the cuminal employed in this example.

EXAMPLE VI

Preparation of the monocarbamates of 1-(4-isopropylphenyl)-2,2,-dimethyl-1,3-dihydroxypropane A stream of ammonia gas was passed for a period of 20 hours through a solution containing 50 ml. of 28% ammonia water, 150 ml. of isopropanol, and 72 g. of monoethyl carbonates and cyclic carbonate of 1-(4-isopropylphenyl)-2,2-dimethyl - 1,3 - dihydroxypropane, prepared as described in Example V. During the introduction of the ammonia gas, the solution was agitated and maintained at room temperature. After the 20 hour period, the mixture was heated for twenty minutes on a steam bath and then permitted to cool. The cooled reaction mixture was added to 500 ml. of cold water. The precipitated crystalline reaction products were dissolved in 200 ml. of isopropanol and refluxed for fifteen minutes, with 2 g. of activated carbon. The hot solution was filtered and the resulting clear solution was placed in a freezer (−5 to −10° C.) overnight. The precipitated crystals were collected on a Buchner funnel and recrystallized from toluene. The products had a melting point of 132–160° C. The nitrogen determination by Kjeldahl was 5.22% as compared with a theoretical value of 5.28%. I.R. curves indicated that the desired products were obtained.

EXAMPLE VII

Preparation of the monoethyl carbonates and cyclic carbonates of 1 - (methylphenyl) - 2,2-dimethyl-1,3-dihydroxypropanes To an agitated mixture of 64.7 g. (0.33 mole) of 1-(methylphenyl)-2,2-dimethyl-1,3-dihydroxypropanes, 34.5 g. (0.34 mole) of triethylamine and 100 ml. of benzene in a 3 necked reaction flask were added over a period of three hours a solution of 42 g. (0.388 mole) of ethylchloroformate in 60 ml. of benzene. During the addition, the reaction mixture was agitated and the temperature maintained between 20-25° C. After the addition, agitation was continued for four hours at room temperature (28.5° C.) The reaction mixture stood overnight and the following day was heated under agitation for three hours, the temperature being maintained at 52-65° C. The reaction mixture was cooled. 250 ml. of water were added to the cooled reaction mixture. Two layers formed and were separated. The organic layer was washed successively, twice with 100 ml. of water, once with 100 ml. of a 5% aqueous hydrochloric acid solution, once with 100 ml. of a dilute sodium bicarbonate solution, and twice with 100 ml. of water. The organic layer was neutral to litmus. The solvent was removed by distillation under vacuum on a steam bath. The weight was 81.7 g. of crude mixed carbonates of the starting glycols. An I.R. curve indicated that the desired products were obtained.

The cyclic carbonates of the 1-(methylphenyl)-2,2-dimethyl-1,3-dihydroxypropanes may be separated out from the crude mixture of carbonates by dissolving this mixture in a suitable solvent such as isopropanol or toluene and keeping this solution under refrigeration at —5° to —10° C. for approximately 24 hours. The cyclic carbonates may be crystallized out and may be separated by filtration on a Buchner funnel. The cyclic carbonates were found to be present in an amount of 12% and had a melting point of 92.3-94.5° C. The mixture of 1-(methylphenyl)-2,2-dimethyl-1,3-dihydroxypropane employed as a starting material in this example was prepared by initially adding to 212 g. of 85% potassium hydroxide in 700 ml. of methanol over a period of 4½ hours, a solution of 368 g. (6½ moles) of isobutyraldehyde, 200 ml. of methanol and 360 g. (3 moles) of a mixture of the three isomeric methyl benzaldehydes (the meta-methyl benzaldehyde being the predominant component). During the addition, the mixture was agitated and maintained at a temperature of 12-16° C. After the addition, agitation was maintained overnight at room temperature. The next day the reaction mixture was acidified with acetic acid and 800 ml. of methanol were distilled off, under agitation, from a steam bath. The reaction product was washed with 800 ml. of warm water and dried in vacuum (from a steam bath). The mixture of the glycols was heavy and viscous. The assay by wet analysis (acetylation) was 97.5%. The mixture boiled at 146-149° C. at 2 mm. The yield of the distilled mixed glycols was 83%. Analysis by acetylation was 100%.

EXAMPLE VIII

Preparation of the monocarbamates of 1-(methylphenyl)-2,2-dimethyl-1,3-dihydroxypropanes A stream of ammonia gas was passed for a period of 19 hours through a solution of 50 ml. of 28% ammonium hydroxide solution, 50 ml. of 2-ethoxyethanol and 80 g. of the mixed ethyl carbonates of 1-(methylphenyl)-2,2-dimethyl-1,3-dihydroxypropanes prepared as described in Example VII. During the passage of the ammonia gas, the solution was agitated and maintained at room temperature. The temperature of the reaction mixture was raised to 50-60° C. and the passage of ammonia gas was continued with agitation for 45 minutes. The solvent was removed under vacuum at steam bath temperatures. A viscous yellow liquid weighing 71.5 g. remained. This liquid was diluted with 150 ml. of toluene and the solution was refluxed for 20 minutes with activated carbon. It was filtered while still hot and the clear solution was placed into a freezer (—5 to —10° C.) overnight. A total of 59 g. of crystalline material was collected. From the collected material, 17.5 g. were recrystallized from isopropanol, again using the activated carbon. 10.2 g. of crystalline material was recovered having a melting point of 88°-99° C. The nitrogen determination was 5.84% compared with a theoretical value of 5.90%. The I.R. curve indicated that the desired monocarbamates were obtained.

EXAMPLE IX

Preparation of the monoethylcarbonates and cyclic carbonate of 1-(3,4-methylenedioxyphenyl)-2,2-dimethyl-1,3-dihydroxypropane The monoethyl carbonates and cyclic carbonate of 1-(3,4-methylenedioxyphenyl)-2,2-dimethyl-1,3-dihydroxypropane are prepared in accordance with the following reaction:

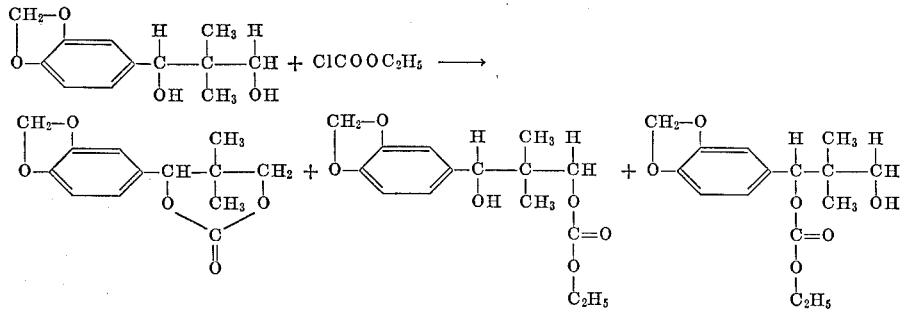

To a well agitated mixture of 224 g. (1 mole) of 1-3,4-methylenedioxyphenyl)-2,2-dimethyl-1,3-dihydroxypropane prepared as described in U.S. Pat. No. 3,092,639 granted on June 4, 1963 to the assignee of K. Kulka, 105.2 g. (1.04 moles) of triethylamine and 300 ml. of benzene were added over a period of three hours, at a temperature between 22-25° C., a solution of 119.4 g. (1.10 moles) of ethyl chloroformate dissolved in 200 ml. of benzene. After the addition, agitation was continued for five hours at room temperature (26° C.). The following day, the reaction mixture was warmed to 58° C. for four hours. 1,000 ml. of water were added under agitation. The reaction mixture separated into two layers. The organic layer was separated from the aqueous part and washed successively with:

2×500 ml. water
250 ml. 5% hydrochloric acid solution
2×250 ml. water
250 ml. saturated sodium bicarbonate solution
250 ml. water.

The solvent, benzene, was distilled off on a steam bath with the application of a slight vacuum. A viscous amber liquid remained, weighing 277.0 g. I.R. curves indicated the reaction represented by the above equation.

The cyclic carbonate may be separated out from the crude mixture of carbonates by dissolving this mixture in a suitable solvent such as isopropanol or toluene and keeping this solution under refrigeration at —5 to —10° C. for approximately 24 hours. The cyclic carbonate may be crystallized out and may be separated by filtration on a Buchner funnel. It was found to be present in the above crude mixture in an amount of 15-20% and has a melting point of 122-125° C. After recrystallization from hot isopropanol it has a melting point of 124.5-125° C. A mixed melting point with a cyclic carbonate prepared from the glycol and phosgene did not give any depression.

EXAMPLE X

Preparation of monocarbamates of 1-(3,4-methylenedioxyphenyl)-2,2-dimethyl-1,3-dihydroxypropane The mixture of carbonates produced in accordance with Example IX are converted to monocarbamates of 1-(3,4-methylenedioxyphenyl) - 2,2 - dimethyl - 1,3 - dihydroxypropane by ammonia treatment in accordance with the following reactions:

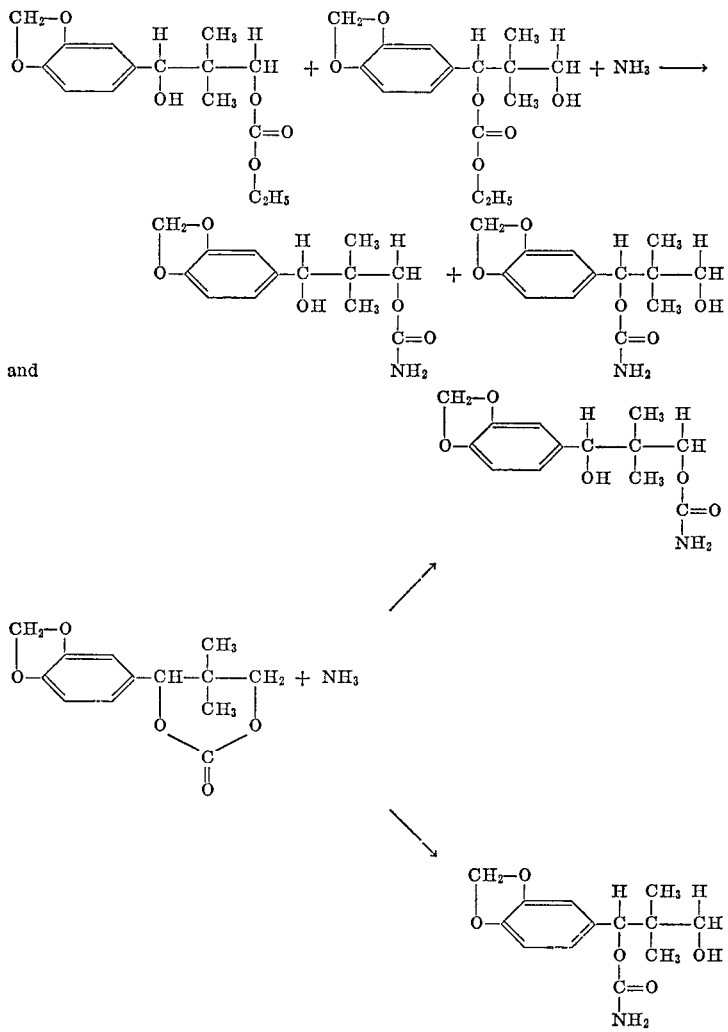

275 g. of crude carbonates of 1-(3,4 - methylenedioxyphenyl) - 2,2 - dimethyl - 1,3 - dihydroxypropane, produced in accordance with Example IX, 400 ml. of 28% ammonia water and 400 ml. of Cellosolve (solvent) were agitated at room temperature and a stream of ammonia gas (NH$_3$) was introduced into this solution over a period of 17 hours. The reaction temperature was then raised to 50–60° C. for two hours with continual agitation and ammonia ebullition. The ammonia gas introduction was stopped and the excess ammonia was evaporated from the reaction mass (under agitation and heat from a steam bath). The solvent was then removed by vacuum distillation. The residual viscous amber liquid was dissolved in 400 ml. of toluene. To this solution was added, under agitation, 1,150 ml. of water. Rapid crystallization took place. The light tan colored crystals were filtered on a Buchner funnel and washed with 300 ml. of cold water. The weight of the crude crystals obtained was 217.2 g. (wet). On standing, the toluene and water separated yielding a total of 46.8 g. crystals. These were separated on a Buchner funnel and combined with the above crystalline part. On recrystallization from isopropanol and again from isopropanol with carbon, a total of 103 g. was obtained (theoretical: 246 g.), representing a yield of 41.8%. The white crystals had a melting point of 118–130° C. A nitrogen determination showed 5.28% compared with a theoretical value of 5.24%. Molecular weight determination (Rast) showed 261 compared with a theoretical of 267. I.R. curves indicated the reactions shown by the above equations.

EXAMPLE XI

Preparation of 1-(4-chlorophenyl)-2,2-dimethyl-1,3-dihydroxypropane-3-carbamate

To a solution of 104 g. of phosgene (1.05 moles) dissolved in 200 ml. of toluene, maintained at a temperature of —5° C., is added over a period of 4 hours, under agitation a solution of 214 g. (1 mole) of 1-(4-chlorophenyl)-2,2-dimethyl-1,3-dihydroxypropane, 400 ml. of tetrahydrofuran and 125 g. (1.03 moles) of dimethylaniline. During the addition, the temperature is maintained at —4° to 0° C. After completion of the addition, the reaction mixture is agitated for an additional 1½ hours keeping the temperature at —4° to +5° C. to produce the monochloroformate of the glycol. The reaction mixture is again cooled to —4° C. and a solution containing 2 moles of ammonia (28–29%) dissolved in water, is added gradually to the reaction mixture. Agitation is continued for an additional ½ hour. The reaction mixture is permitted to come to room temperature. 500 ml. of warm water are added under agitation and the lower aqueous layer is separated and discarded. This procedure is repeated. The solvent is distilled off. The remaining crude reaction product and dimethylaniline remains in the reaction flask. The dimethylaniline is removed by steam distillation. The reaction product is taken up in 300 ml. of benzene and is liberated from any moisture by reflux with a water trap. One gram of activated carbon is added and reflux is continued for approximately ½ hour. The benzene solution is filtered hot. On standing overnight at room temperature crystals are formed which on separation on a Buchner funnel amount to approximately 50–55% of the theoretical of 1-(4-chlorophenyl)-2,2-dimethyl-1,3-dihydroxypropane-3-carbamate. The mother liquor is concentrated and yields another 10–15% of the desired product having a melting point of 134° C. and having the following formula:

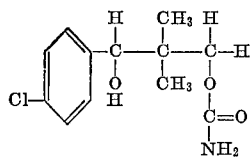

The 3-monocarbamates of the corresponding dihalogen and trihalogen ring substituted glycols are produced in the same manner as described in this example. For instance, the 3-monocarbamates of dihalogen or trihalogen ring substituted glycols, such as 1-(2,4-dichlorophenyl)-2,2-dimethyl-1,3-dihydroxypropane or 1-(3,4,5-trichlorophenyl)-2,2-dimethyl-1,3-dihydroxypropane are prepared in the same manner as the 1-(4-chlorophenyl)-2,2-dimethyl-1,3-dihydroxypropane-3-monocarbamate, as described, in this example except that one mole of 1-(2,4-dichlorophenyl)-2,2-dimethyl-1,3-dihydroxypropane or one mole of 1-(3,4,5-trichlorophenyl)-2,2-dimethyl-1,3-dihydroxypropane is employed instead of one mole of 1-(4-chlorophenyl)-2,2-dimethyl - 1,3 - dihydroxypropane as heretofore described in this example.

The other derivatives of dihalogen ring substituted glycols or trihalogen ring substituted glycols are produced in the same manner as derivatives of the monohalogen ring substituted glycols described in Examples XII and XV. In all cases, the procedures in these examples are followed except that instead of employing the 1-(4-chlorophenyl)-2,2-dimethyl-1,3,-dihydroxypropane, the same molecular equivalent of the corresponding dihalogen or trihalogen ring substituted glycols is employed. In the preparation of the cyclic carbonates of the corresponding dihalogen or trihalogen ring substituted glycols, the procedure of Example XIII is followed except that molecular equivalent of the mono-ethylcarbonate of the corresponding dihalogen or trihalogen ring substituted glycols are used. In the preparation of the 1-carbamates of the corresponding dihalogen and trihalogen ring substituted glycols, the procedure of Example XIV is followed except that the molecular equivalent of the cyclic carbonate of the corresponding dihalogen or trihalogen ring substituted glycols is employed.

EXAMPLE XII

Preparation of ethylcarbonates of 1-(4-chlorophenyl)-2,2-dimethyl-1,3-dihydroxypropane To a solution of 107.2 g. (½ mole) of 1-(4-chlorophenyl)-2,2-dimethyl-1,3-dihydroxypropane and 54.6 g. (0.54 mole) of triethylamine in 150 ml. of benzene was added over a period of 3 hours with agitation a solution of 60 g. of ethyl chloroformate (0.55 mole) in 100 ml. of benzene. During the addition, the solution was maintained at 20–25° C. The agitation was continued at room temperature for 2 hours, then for 3 hours at 40–60° C. It was then cooled to room temperature and 300 ml. of water was added with agitation over a period of 5 minutes. The mixture separated into two layers. The aqueous part was extracted with 100 ml. of benzene and this extract was added to the main organic part. The organic part was washed twice with 250 ml. of water and then successively with 150 ml. of 5% aqueous hydrochloric acid, 250 ml. of water and 200 ml. of aqueous sodium bicarbonate solution. Finally, it was washed twice with 200 ml. of water. The solvent was removed by vacuum distillation on a steam bath. A pale, viscous oil resulted weighting 137.5 g. An I.R. examination indicated that the desired product was obtained. The resulting product comprised a mixture of ethyl carbonates of the glycol having the following formulas:

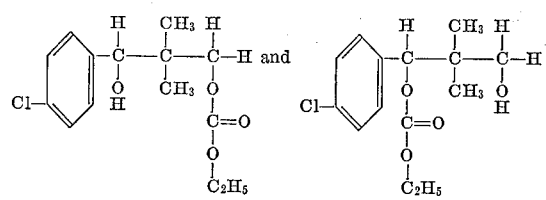

EXAMPLE XIII

Preparation of cyclic carbonate of 1-(4-chlorophenyl)-2,2-dimethyl-1,3-dihydroxypropane 137.5 g. of the monoethylcarbonates of Example XII was placed in a distillation flask and heated to 120–170° C. in a vacuum of 6–7 mm. The formed ethanol was permitted to distill off. The progress of the reaction was followed by the examination of samples using I.R. After 20 hours, the reaction was completed. The product was a hard yellow mass. It was recrystallized from chloroform and then again recrystallized from toluene. There was obtained 82.1 g. of the cyclic carbonate having a melting point of 120–123° C. and having the formula:

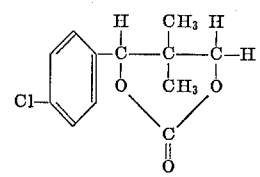

I.R. examination indicated that the desired carbonate was obtained.

EXAMPLE XIV

Preparation of 1-(4-chlorophenyl)-2,2-dimethyl-1,3-dihydroxypropane-1-carbamate

To a solution of 240 g. of cyclic carbonate of 1-(4-chlorophenyl)-2,2-dimethyl - 1,3 - dihydroxypropane and 100 ml. of ammonia water (28–29%) dissolved in 360 ml. of isopropanol was passed a steady stream of ammonia gas over a period of 18 hours. During the passage, the solution was agitated and kept at 35–40° C. The mixture was then heated to permit the unreacted ammonia gas to escape. The isopropanol was removed by distillation. The reaction mass was washed three times with 150 ml. of warm water. It was taken up in 300 ml. of benzene and moisture was removed by reflux with a water trap. One gram of activated carbon was added to the benzene solution and reflux maintained for ½ hour. The hot solution was filtered and permitted to crystallize at room temperature. After 24 hours, the formed crystals were filtered on a Buchner funnel and recrystallized from benzene. A 45% yield of the desired 1-monocarbamate having a melting point of 171° C. was obtained having the following formula:

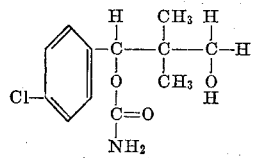

EXAMPLE XV

Preparation of monoacetate of 1-(4-chlorophenyl)-2,2-dimethyl-1,3-dihydroxypropane The following mixture was prepared and refluxed with a water trap: 53.6 g. of 1-(4-chlorophenyl)-2,2-dimethyl-1,3-dihydroxypropane, 16.5 g. of acetic acid (¼ mole plus 10% excess), 0.25 g. of p-toluenesulfonic acid, and 150 ml. of toluene. After one hour, the theoretical amount of water was collected in the water trap. The reaction mixture was cooled to room temperature and washed successively with 75 ml. of dilute aqueous sodium carbonate solution, 75 ml. of dilute aqueous sodium bicarbonate solution and 100 ml. of water. The solvent was distilled off under vacuum. 60 ml. of hexane was added to the remaining crude reaction mixture. On heating and then cooling under agitation, crystals formed, which were collected on a Buchner funnel. These crystals were recrystallized from benzene and had a melting point of 78.5–80° C. Wet analysis indicated a purity of 99% of the monoacetate. The yield was 80% of the theoretical. I.R. indicated the desired monoester was obtained. The formula of the product obtained is:

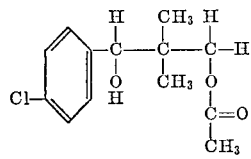

EXAMPLE XVI

Preparation of monomethylcarbamates of 1-phenyl-2,2-dimethyl-1,3-dihydroxypropane To a solution of 180 g. (1 mole) of 1-phenyl-2,2-dimethyl-1,3-dihydroxypropane in 200 ml. of tetrahydrofuran was added a solution of 62.7 g. (1 mole plus 10% excess) of methyl isocyanate in 100 ml. of tetrahydrofuran. To the resulting solution were added 3 drops of pyridine as a catalyst. The reaction mixture was permitted to stand at room temperature for 24 hours. The tetrahydrofuran and excess methyl isocyanate were removed by distillation. The crude reaction product was twice recrystallized from benzene. A 70% theoretical yield was obtained. The product had a melting point of 117–118° C. I.R. examination and nitrogen determination by Kjeldahl indicated the desired product was obtained. The product was a mixture of monomethylcarbamates having the formulas:

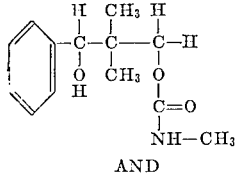

AND

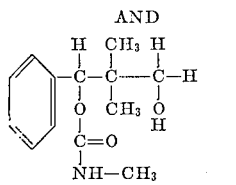

EXAMPLE XVII

Preparation of monophenylcarabamates of 1-phenyl-2,2-dimethyl-1,3-dihydroxypropane To a solution of 180 g. (1 mole) of 1-phenyl-2,2-dimethyl-1,3-dihydroxypropane in 200 ml. of tetrahydrofuran was added a solution of 121 (1 mole plus 10% excess) of phenyl isocyanate in 200 ml. of tetrahydrofuran. To the resulting solution were added 3 drops of pyridine as a catalyst. The reaction mixture was permitted to stand at room temperature for 24 hours. The tetrahydrofuran and the excess phenyl isocyanate were removed by distillation. The resulting crude reaction product was twice recrystallized from benzene. An 80% theoretical yield was obtained. The product had a melting point of 106–110° C. I.R. examination and nitrogen determination by Kjeldahl indicated that the desired product was obtained. The product was a mixture of monophenyl carbamates having the formulas:

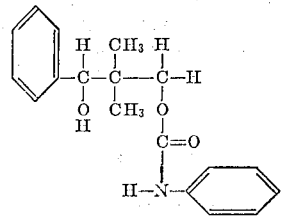

and

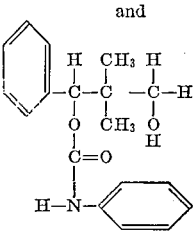

EXAMPLE XVIII

Preparation of monomethylcarbamates of 1-methylenedioxyphenyl-2,2-dimethyl-1,3-dihydroxypropane To a solution of 224 g. (1 mole) of 1-methylenedioxyphenyl-2,2-dimethyl-1,3-dihydroxypropane in 200 ml. of tetrahydrofuran was added a solution of 62.7 g. (1 mole plus 10% excess) of methyl isocyanate in 100 ml. of tetrahydrofuran. To the resulting solution were added 3 drops of pyridine as a catalyst. The reaction mixture was permitted to stand at room temperature for 24 hours. The tetrahydrofuran and excess methyl isocyanate was removed by distillation. The crude reaction product was twice recrystallized from benzene. A 75% theoretical yield was obtained. The product had a melting point of 102–103° C. I.R. examination and nitrogen determination by Kjeldahl indicated that the desired product was obtained. The product was a mixture of monomethyl carbamates having the formulas:

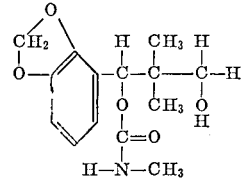

and

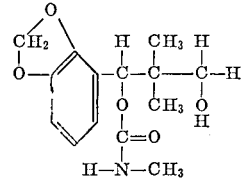

EXAMPLE XIX

Preparation of monoethylcarbamates of 1-methylenedioxyphenyl-2,2-dimethyl-1,3-dihydroxypropanes To a solution of 224 g. (1 mole) of 1-methylenedioxyphenyl-2,2-dimethyl-1,3-dihydroxypropane in 200 ml. of tetrahydrofuran was added a solution of 78 g. (1 mole plus 10% excess) of ethyl isocyanate in 200 ml. of tetrahydrofuran. To the resulting solution were added 3 drops of pyridine as a catalyst. The reaction mixture was permitted to stand at room temperature for 24 hours. The tetrahydrofuran and the excess ethyl isocyanate were removed by distillation. The crude reaction product was twice recrystallized from benzene. A 70% theoretical yield was obtained. The product had a melting point of 80.5–84° C. I.R. examination and nitrogen determination by Kjeldahl indicated that the desired product was obtained. The product was a mixture of monoethyl carbamates having the formulas:

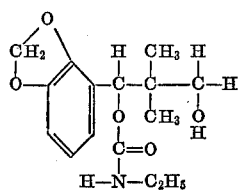

and

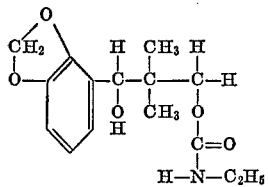

EXAMPLE XX

Preparation of monophenylcarbamates of 1-methylenedioxyphenyl-2,2-dimethyl-1,3-dihydroxypropane To a solution of 224 g. (1 mole of 1-methylenedioxyphenyl-2,2-dimethyl-1,3-dihydroxypropane in 200 ml. of tetrahydrofuran was added a solution of 121 g. (1 mole plus 10% excess) of phenyl isocyanate in 200 ml. of tetrahydrofuran. To the resulting solution was added 3 drops of pyridine as a catalyst. The reaction mixture was permitted to stand at room temperature for 24 hours. The tetrahydrofuran and the excess phenyl isocyanate were removed by distillation. The crude reaction product was twice recrystallized from benzene. A 72% theoretical yield was obtained. The product had a melting point of 138–144° C. I.R. examination and nitrogen determination by Kjeldahl indicated that the desired product was obtained. The product was a mixture of monophenyl carbamates having the formulas:

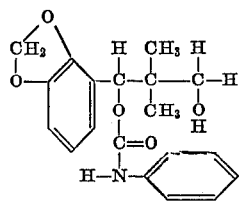

and

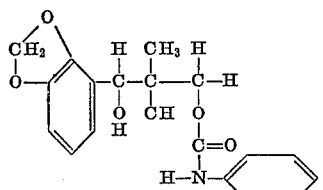

EXAMPLE XXI

Preparation of monoethylcarbamates of 1-(napthyl)-2,2-dimethyl-1,3-dihydroxypropane To a solution of 57.5 g. (¼ mole) of 1-(naphthyl)-2,2-dimethyl-1,3-dihydroxypropane having a melting point of 112–114° C. in 100 ml. of tetrahydrofuran was added to a solution of 19 g. of ethyl isocyanate in 50 ml. of tetrahydrofuran. To the resulting clear solution was added 1 drop of pyridine as a catalyst. The solution was permitted to stand at room temperature for 2 days. The tetrahydrofuran and unreacted ethyl isocyanate were removed by distillation. The remaining crude reaction product was recrystallized from a mixture of 50 ml. of benzene and 50 ml. of hexane. The mixture of the two isomeric monoethylcarbamates crystallized on cooling and was collected on a Buchner funnel. The product had a melting point of 98.5 to 105° C. and was obtained in an 80% yield of the theoretical. The product was identified by the I.R. examination and nitrogen determination by Kjeldahl as the desired mixture of monocarbamates having the formulas:

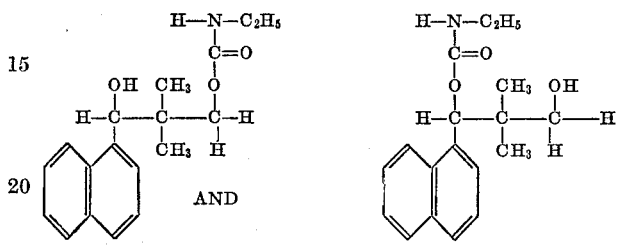

EXAMPLE XXII

Preparation of the monocarbamates of 1-(4-chlorophenyl)-2-methyl-2-propyl-1,3-dihydroxypropane To a solution of 61 g. of 1-(4-chlorophenyl)-2-methyl-2-propyl-1,3-dihydroxypropane in 50 ml. of tetrahydrofuran was added a solution of 18 g. of ethyl isocyanate in 50 ml. of tetrahydrofuran. To the resulting solution was added 1 drop of pyridine as a catalyst. The solution was permitted to stand at room temperature for 2 days. The excess of ethyl isocyanate and tetrahydrofuran was removed by distillation. The crude reaction product was taken up in 100 ml. of benzene. The resulting solution was washed successively with 50 ml. of water, 50 ml. of sodium bicarbonate solution and 50 ml. of water. After removal of the benzene by distillation in vacuum, a heavy very viscous, light yellow mass resulted. I.R. and nitrogen determination by Kjeldahl indicated that the desired mixture of monocarbamates having the following formulas were obtained.

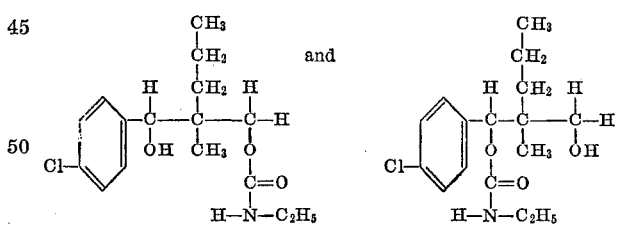

EXAMPLE XXIII

Preparation of the secondary monocarbamate of 1-phenyl-2,2-dimethyl-1,3-dihydroxypropane A solution of phosgene is prepared by dissolving 50 g. of phosgene in 500 ml. of toluene by adding to the toluene, phosgene as a gas, with slow agitation over a period of 1½ hours and at a temperature of −2 to −5° C. To this phosgene solution is added, over a period of 1½ hours at a temperature of 1 to −4° C., a solution of 111 g. of the primary monoacetate of 1-phenyl-2,2-dimethyl - 1,3 - dihydroxypropane, 53 g. of triethylamine and 200 ml. of toluene. After completion of the addition, agitation is continued for 15 minutes followed by gradual addition, with agitation over a period of 1 hour, 150 ml. of ammonia water. During the addition, the reaction mixture is maintained at a temperature of 0 to 15° C. The reaction mass is then heated to 50° C. under a slight pressure and agitated for a period of 5 hours. After cooling to room temperature, the reaction mass is washed successively with 100 ml. of a 15% aqueous solution of sodium carbonate, 100 ml. of a 5% aqueous solution of sodium bicarbonate and twice with 100 ml. of water. The organic part is separated and then refluxed with 1 g. of activated carbon and filtered while hot. On cooling, the secondary carbamate of the glycol crystallizes and is collected on a Buchner funnel. On recrystallization from 200 ml. of toluene, the secondary monocarbamate of 1-phenyl-2,2-dimethyl-1,3-dihydroxypropane having the following formula is obtained:

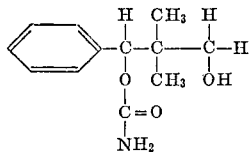

The primary monoacetate of 1-phenyl-2,2-dimethyl-1,3-dihydroxypropane which is used in this example is prepared in the same manner as the monoacetate of 1-(4-chlorophenyl)-2,2-dimethyl - 1,3-dihydroxypropane, as described in Example XV, except that ¼ mole of 1-phenyl - 2,2 - dimethyl-1,3-dihydroxypropane is employed instead of ¼ mole of 1-(4-chlorophenyl) - 2,2-dimethyl-1,3-dihydroxypropane.

The secondary monocarbamate of 1 - phenyl-2,2-dimethyl-1,3-dihydroxypropane may also be produced by the utilization of a lower alkyl chloroformate or an aryl chloroformate.

A solution of ethyl chloroformate is prepared by dissolving at room temperature 55 g. of ethyl chloroformate in 150 ml. of toluene. To this solution is added with agitation over a period of 1½ hours at a temperature of 1 to —4° C., a solution of 111 g. of the primary monoacetate of 1 - phenyl - 2,2 - dimethyl-1,3-dihydroxypropane, 53 g. of triethylamine and 200 ml. of toluene. After completion of the addition, agitation is continued for 15 minutes, followed by the gradual addition, with agitation over a period of an hour, of 150 ml. of ammonia water. During the addition, the reaction mixture is maintained at a temperature of 0 to 15° C. The reaction mass is then heated to 50° C. under a slight pressure and agitated for 5 hours. After cooling to room temperature, the reaction mass is washed successively with 100 ml. of a 15% aqueous solution of sodium carbonate, 100 ml. of 5% aqueous sodium bicarbonate solution and twice with 100 ml. of water. The organic part is separated and then refluxed with 1 g. of activated carbon and filtered while hot. On cooling, the secondary carbamate crystallizes and is collected on a Buchner funnel. On recrystallization from 200 ml. of toluene, the secondary carbamate of 1 - phenyl - 2,2 - dimethyl-1,3-dihydroxypropane is obtained.

If desired, the secondary carbamate of 1-phenyl-2,2-dimethyl-1,3 - dihydroxypropane may be produced by utilizing an aryl chloroformate, such as phenyl chloroformate. In such preparation, 80 g. of phenyl chloroformate is employed instead of 55 g. of ethyl chloroformate. With the phenyl chloroformate, the secondary hydroxyl of the monoacetate ester is reacted to produce the secondary phenyl carbonate of the primary acetate of 1-phenyl-2,2-dimethyl - 1,3 - dihydroxypropane. The secondary phenyl carbonate of the primary acetate is converted by the addition of ammonia water to the secondary carbamate of 1-phenyl-2,2 - dimethyl-1,3-dihydroxypropane.

What is claimed is:

1. Monocarbamate, N-phenyl monocarbamate and N-lower alkyl monocarbamate of a glycol having the formula:

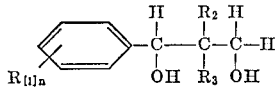

in which $n$ is 1 when $R_n$ is hydrogen, alkyl having less than 6 carbon atoms, hydroxy, alkoxy having less than 6 carbon atoms, or monochloro, $n$ is 2 when $R_n$ is 3,4-methylenedioxy, dichloro or phenylene fused to the phenyl ring to form naphthyl, $n$ is 3 when $R_n$ is trichloro, and $R_2$ and $R_3$ are alkyl in which the total number of carbon atoms is at least 2 and less than 8, wherein lower alkyl has not more than 5 carbon otams.

2. Monocarbamate of claim 1 which is 3-monocarbamate.

3. Monocarbamate of claim 1 which is 1-monocarbamate.

4. N-lower alkyl monocarbamate of claim 1 which is N-lower alkyl-3-monocarbamate.

5. N-lower alkyl monocarbamate of claim 1 which is N-lower alkyl-1-monocarbamate.

6. Monocarbamate of claim 1 which is monocarbamate of 1-phenyl-2,2-dimethyl-1,3-dihydroxypropane.

7. Monocarbamate of claim 1 which is monocarbamate of 1-(4-isopropylphenyl) - 2,2 - dimethyl-1,3-dihydroxypropane.

8. Monocarbamate of claim 1 which is monocarbamate of 1-(4-methoxyphenyl) - 2,2 - dimethyl-1,3-dihydroxypropane.

9. Monocarbamate of claim 1 which is monocarbamate of 1-methylphenyl - 2,2 - dimethyl - 1,3-dihydroxypropane.

10. Monocarbamate of claim 1 which is monocarbamate of 1-(3,4 - methylenedioxyphenyl) - 2,2 - dimethyl-1,3-dihydroxypropane.

11. Monocarbamate of claim 1 which is monocarbamate of 1-(4-chlorophenyl) - 2,2 - dimethyl - 1,3-dihydroxypropane.

12. Monocarbamate of claim 1 which is monocarbamate of 1 - (4 - chlorophenyl) - 2 - methyl - 2 - propyl-1,3-dihydroxypropane.

13. Monocarbamate of claim 1 which is monocarbamate of 1-naphthyl-2,2-dimethyl-1,3-dihydroxypropane.

14. Monocarbamate of claim 1 which is 1-(4-chlorophenyl) - 2,2-dimethyl-1,3-dihydroxypropane - 3 - carbamate having the formula:

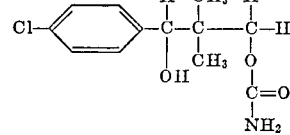

15. Monocarbamate of claim 1 which is 1-(4-chlorophenyl) - 2,2 - dimethyl - 1,3 - dihydroxypropane-1-carbamate having the formula:

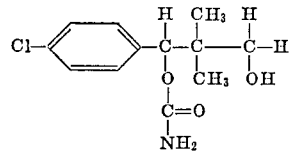

16. Monocarbamate of claim 1 in which $R_n$ is hydrogen.

17. Monocarbamate of claim 1 in which $R_n$ is monoalkyl having less than 6 carbon atoms.

18. Monocarbamate of claim 1 in which $R_n$ is monohydroxy.

19. Monocarbamate of claim 1 in which $R_n$ is monoalkoxy having less than 6 carbon atoms.

20. Monocarbamate of claim 1 in which $R_n$ is 3,4-methylenedioxy.

21. Monocarbamate of claim 1 in which $R_n$ is phenylene fused to the phenyl ring to form naphthyl.

22. Monocarbamate of claim 1 in which $R_n$ is monochloro.

23. Monocarbamate of claim 1 in which $R_n$ is dichloro.

24. Monocarbamate of claim 1 in which $R_n$ is trichloro.

25. Monocarbamate of claim 1 in which the total number of carbon atoms of $R_2$ and $R_3$ is 2.

References Cited
UNITED STATES PATENTS

| | | |
|---|---|---|
| 2,848,959 | 8/1958 | Pribyl et al. |
| 2,856,411 | 10/1958 | Prill _____ 260—340.5 |
| 3,040,089 | 6/1962 | Kulka. |
| 3,092,639 | 6/1963 | Kulka. |
| 3,169,985 | 2/1965 | de Stevens _____ 260—482 |
| 3,265,728 | 8/1966 | Bossinger et al. _____ 260—482 |

ALEX MAZEL, Primary Examiner

I. H. TURNIPSEED, Assistant Examiner

U.S. Cl. X.R.

260—340.2, 163, 482, 488; 424—282, 300, 031, 311